(12) United States Patent
Cheong et al.

(10) Patent No.: US 11,355,947 B2
(45) Date of Patent: Jun. 7, 2022

(54) APPARATUS INCORPORATING NON-ISOLATED CHARGER AND DC CONVERTER

(71) Applicants: Hyundai Motor Company, Seoul (KR); Kia Motors Corporation, Seoul (KR)

(72) Inventors: Dea Ki Cheong, Yongin-si (KR); Dae Woo Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 447 days.

(21) Appl. No.: 16/530,128

(22) Filed: Aug. 2, 2019

(65) Prior Publication Data

US 2020/0195035 A1 Jun. 18, 2020

(30) Foreign Application Priority Data

Dec. 18, 2018 (KR) .......................... 10-2018-0163720

(51) Int. Cl.
*H02J 7/00* (2006.01)
*H02J 7/02* (2016.01)
*H02M 3/335* (2006.01)
*H02M 3/158* (2006.01)
*B60L 53/22* (2019.01)
*H02M 1/42* (2007.01)

(52) U.S. Cl.
CPC .............. *H02J 7/022* (2013.01); *B60L 53/22* (2019.02); *H02J 7/027* (2013.01); *H02M 3/158* (2013.01); *H02M 3/33569* (2013.01); *B60L 2210/12* (2013.01); *B60Y 2200/91* (2013.01); *B60Y 2200/92* (2013.01); *H02M 1/4208* (2013.01)

(58) Field of Classification Search
USPC ................................. 320/101, 106, 107, 108
See application file for complete search history.

(56) References Cited

U.S. PATENT DOCUMENTS

| 10,079,541 | B1* | 9/2018 | Taban ..................... H02J 1/102 |
| 2011/0144842 | A1* | 6/2011 | Nl .......................... B60W 10/26 |
| | | | 701/22 |
| 2011/0156643 | A1* | 6/2011 | Chen ...................... B60L 58/20 |
| | | | 320/109 |
| 2013/0106342 | A1* | 5/2013 | Iwata ..................... B60L 8/003 |
| | | | 320/101 |

(Continued)

FOREIGN PATENT DOCUMENTS

KR 10-2017-0131895 A 12/2017
WO WO-2012011176 A1 * 1/2012 ............ B60L 3/0069

*Primary Examiner* — Brian Ngo
(74) *Attorney, Agent, or Firm* — Morgan, Lewis & Bockius LLP

(57) ABSTRACT

An apparatus of incorporating a non-isolated charger and a DC converter, may include a non-isolated charger including a non-isolated converter converting a level of input voltage and outputting converted voltage to a battery; and a DC converter including a first switch selectively making an electrical connection to a connection node of the non-isolated converter and the battery and a primary side circuit including at least some of switching elements included in the non-isolated converter and converting a level of voltage of the battery transmitted by the primary side circuit and outputting converted voltage.

7 Claims, 3 Drawing Sheets

(56) References Cited

U.S. PATENT DOCUMENTS

| | | | |
|---|---|---|---|
| 2016/0026205 A1* | 1/2016 | Song | G05F 3/08 |
| | | | 323/313 |
| 2016/0236580 A1* | 8/2016 | Hou | B60L 58/20 |
| 2018/0287494 A1* | 10/2018 | Yano | H02M 3/158 |
| 2019/0023149 A1* | 1/2019 | Chen | B60L 58/22 |
| 2020/0195035 A1* | 6/2020 | Cheong | H02M 3/158 |
| 2021/0006075 A1* | 1/2021 | Rentel | H02J 7/00714 |

* cited by examiner

APPARATUS INCORPORATING NON-ISOLATED CHARGER AND DC CONVERTER

CROSS REFERENCE TO RELATED APPLICATION

The present application claims priority to Korean Patent Application No. 10-2018-0163720, filed Dec. 18, 2018, the entire contents of which is incorporated herein for all purposes by this reference.

BACKGROUND OF THE INVENTION

Field of the Invention

The present invention relates to an apparatus of incorporating a non-isolated charger and a DC converter and, more particularly, to an apparatus of incorporating a non-isolated charger and a DC converter implemented by sharing some of switching elements composing the non-isolated charger that provides charging power to a battery with a primary circuit of the DC converter.

Description of Related Art

Generally, an electric vehicle or a plug-in hybrid vehicle may include an energy storage device (hereinafter referred to as a high-voltage battery) storing electric power supplied to an electric motor, an on-board charger (OBC) receiving external commercial AC power input thereinto and converting the AC power into DC power for charging to charge the high-voltage battery, and a low-voltage DC-DC converter (LDC) converting a high-voltage output from the high-voltage battery into low voltage and then providing the lower voltage to an electric field load or power for charging a low voltage energy storage device (hereinafter referred to as a low-voltage battery) provided for the electric field load.

To reduce the number of components by incorporating various circuits as described above and thus to realize an effect of cost reduction, a technology commonly using a secondary side rectifier circuit of an isolated OBC and a primary side switching circuit of the LDC has been conventionally provided.

The isolated OBC may include an isolated DC converter therein, and the secondary rectifier circuit of the isolated DC converter is implemented as a half bridge or full bridge circuit including a plurality of switching elements. Further, when the LDC is manufactured in an isolated type, a primary side thereof is implemented as a half bridge or full bridge circuit including a plurality of switching elements. However, a secondary side bridge circuit of the OBC operates as a rectifier circuit, and a primary side bridge circuit of the LDC operates to convert the direct current to AC.

Therefore, conventionally, the secondary side bridge circuit of the OBC and the primary side circuit of the LDC are shared with each other as one circuit, and as such, when the OBC operates, the switching element is controlled so that the shared bridge circuit operates as a rectifier circuit, and, when the LDC operates, the switching element of the shared bridge circuit is controlled so that the AC conversion may be performed.

However, as voltage applied to the electric vehicle or the plug-in hybrid vehicle has been recently increased, expensive switching elements having high withstand voltage characteristics may be applied to such circuits. Therefore, a circuit structure of the isolated OBC requiring a large number of switching elements has gradually been changed to non-isolated type. Therefore, there is a problem that the circuit sharing structure applied to the conventional isolated OBC may not be applied to the non-isolated OBC.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of incorporating a non-isolated charger and a DC converter configured for reducing the number of components by sharing some components in an OBC having a non-isolated structure with an LDC.

In various aspects of the present invention, there is provided an apparatus of incorporating a non-isolated charger and a DC converter, the apparatus including: a non-isolated charger including a non-isolated converter converting a level of input voltage and outputting converted voltage to a battery; and a DC converter including a first switch selectively making an electrical connection to a connection node of the non-isolated converter and the battery and a primary side circuit including at least some of switching elements included in the non-isolated converter and converting a level of voltage of the battery transmitted by the primary side circuit and outputting converted voltage.

In an exemplary embodiment of the present invention, the non-isolated converter may include a current interruption circuit including a plurality of switching elements for interrupting a transmission of an overcurrent and a leakage current input thereinto to the battery and realizes the primary side circuit by controlling states of the plurality of switching elements in the current interruption circuit.

In an exemplary embodiment of the present invention, the non-isolated converter may be a buck converter including: a first switching element having a first end portion connected to a positive terminal of input terminals; an inductor having a first end portion connected to a second end portion of the first switching element and a second end portion connected to a positive terminal of the battery; and a first diode having a cathode connected to the first end portion of the inductor and an anode connected to a negative terminal of the battery.

In an exemplary embodiment of the present invention, the non-isolated converter may include: a second switching element having a first end portion connected to the second end portion of the first switching element and a second end portion connected to a negative terminal of the input terminals; a third switching element having a first end portion connected to the cathode of the first diode and a second end portion connected to a connection node of the first switching element and the second switching element; a fourth switching element having a first end portion connected to the connection node of the first switching element and the second switching element; a second diode having an anode connected to a second end portion of the fourth switching element and a cathode connected to the cathode of the first diode; a fifth switching element having a first end portion connected to the second end portion of the second switching element; and a second switch having a first end portion connected to a second end portion of the fifth switching element and a second end portion connected to the anode of the first diode.

In an exemplary embodiment of the present invention, a first end portion of the first switch may be connected to the positive terminal of the battery, the primary side circuit may further include a clamp capacitor and a clamp switching element connected to each other in series, and a first end portion of a serial connection structure of the clamp capacitor and the clamp switching element is connected to a second end portion of the first switch and a second end portion of the serial connection structure is connected to a first end portion of a switching element included in the current interruption circuit and having a second end portion connected to the negative terminal of the battery.

In an exemplary embodiment of the present invention, the first end portion of the first switch may be connected to the first end portion of the third switching element, the primary side circuit may further include a clamp capacitor and a clamp switching element connected to each other in series, and a first end portion of the serial connection structure of the clamp capacitor and the clamp switching element may be connected to the second end portion of the first switch and the second end portion of the serial connection structure may be connected to the first end portion of the second switching element.

In an exemplary embodiment of the present invention, when the apparatus of incorporating a non-isolated charger and a DC converter operates as a DC converter, the first switching element, the third switching element, and the fourth switching element may be turned off, and the fifth switching element and the second switch may be turned on, and the primary side circuit may include the clamp capacitor, the clamp switching element, and the second switching element, and may be implemented as an active clamp circuit where the second switching element operates as a power switch.

In an exemplary embodiment of the present invention, when the apparatus of incorporating a non-isolated charger and a DC converter operates as a charger, the first switch may be turned off.

According to the apparatus of incorporating a non-isolated charger and a DC converter, the primary circuit of the DC converter is implemented by use of the switching element included in the non-isolated converter of the non-isolated charger, whereby the number of switching elements required for manufacturing the DC converter may be reduced.

Accordingly, according to the apparatus of incorporating a non-isolated charger and a DC converter, not only the size of the entire circuit may be reduced, but also the cost required for the switching elements is saved, whereby the manufacturing cost of the vehicle may be reduced.

The effects obtained as an exemplary embodiment of the present invention are not limited to the effects mentioned above, and other effects not mentioned may be clearly understood by those skilled in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
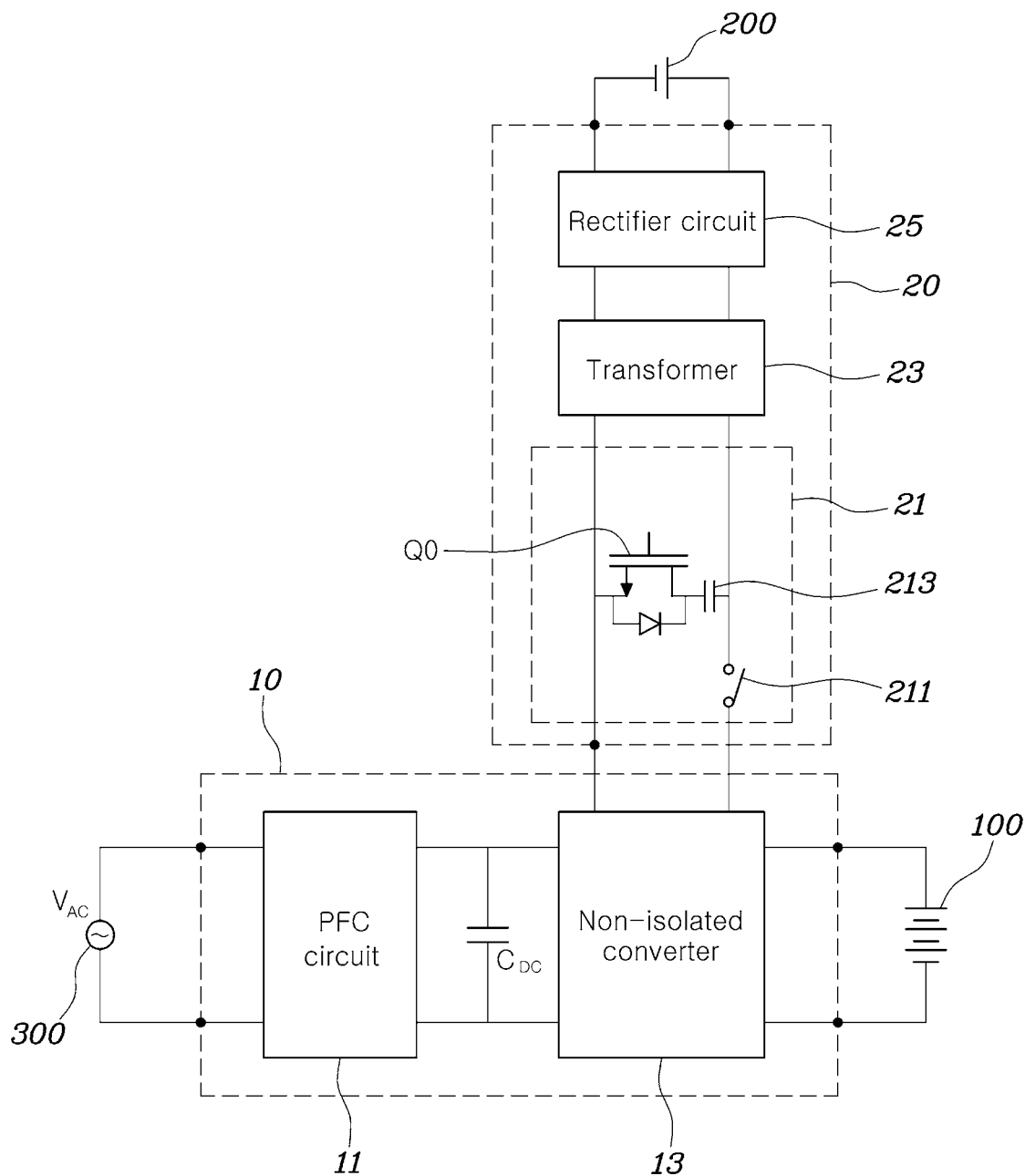
FIG. 1 is a block diagram of an apparatus of incorporating a non-isolated charger and a DC converter according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an exemplary embodiment of an apparatus of incorporating a non-isolated charger and a DC converter will be described in detail with reference to the accompanying drawings.

FIG. 1 is a block diagram of an apparatus of incorporating a non-isolated charger and a DC converter according to an exemplary embodiment of the present invention.

With reference to FIG. 1, the apparatus of incorporating a non-isolated charger and a DC converter according to an exemplary embodiment of the present invention may be configured to include: a non-isolated charger 10 including a non-isolated converter 13 converting a level of input voltage and outputting the predetermined voltage to a battery 100; and a DC converter 20 including a first switch 211 selectively making an electrical connection to a connection node of the non-isolated converter 13 and the battery 100 and a primary side circuit 21 formed by turning on/off of switching elements included in the non-isolated converter 13 and converting a level of voltage of the battery 100 transmitted by the primary side circuit 21 and outputting converted voltage.

The non-isolated charger 10 is a circuit that receives AC power supplied from an AC power source 300, converts the AC power input therein, and then outputs DC power having a voltage level configured for charging the battery 100. Meanwhile, the non-isolated charger 10 is called an on-board charger (OBC) in an electric car or a plug-in hybrid car.

The non-isolated charger 10 may include a power factor correction (PFC) circuit 11 outputting a DC voltage by compensating a power factor of the AC power input thereinto, a DC link capacitor $C_{DC}$ forming a DC voltage at output terminals of the PFC circuit 11, and a non-isolated converter 13 converting the level of the DC voltage formed in the DC link capacitor $C_{DC}$ to the level required to charge the battery 100. A filter circuit may be provided on the input side of the PFC circuit 11, that is, on a terminal side connected to the AC power source 300, for eliminating high frequency noise components of the AC power input thereinto.

The PFC circuit 11 is typically implemented by use of topology of a boost converter, and a specific circuit structure is not only well known in the art but also not directly related to the technical features of the present invention, so further explanation will be omitted.

The non-isolated converter 13 converts the level of the voltage of the DC link capacitor $C_{DC}$ corresponding to the output voltage of the PFC circuit 11 into a voltage level for charging the battery 100 and provides converted voltage to the battery 100.

Conventionally, an isolated converter having input and output terminals isolated from each other has been mainly used. However, because a high-priced switching elements having a high withstand voltage characteristics is required for a converter according to the battery 100 having an increased high voltage, a non-isolated converter as in an exemplary embodiment of the present invention is mainly employed recently instead of an isolated converter requiring a large number of switching elements.

The non-isolated converter 13 is a simple structure having a small number of switching elements, and thus has an advantage that it is simple to implement and has low cost. However, because the input and output terminals are not isolated, there is a disadvantage that an overcurrent, a leakage current, or the like flowing into the input terminals is directly transmitted to the output terminals. To resolve this, the non-isolated converter may include switching elements interrupting the overcurrent or the leakage current.

In an exemplary embodiment of the present invention, because a primary circuit of the DC converter 20 is constituted by using switching elements for current interruption provided in the non-isolated converter 13, it is not necessary to provide a separate switching element to realize the primary circuit of the DC converter 20. Accordingly, the exemplary embodiment of the present invention may achieve cost reduction by reducing the number of elements to be used as compared with the case where the non-isolated converter and DC converter are each manufactured separately.

The DC converter 20 may include the primary side circuit 21 including at least some of the switching elements forming the non-isolated converter 13 and a switching element Q0 and a capacitor 213 separately provided, a transformer 23 including a primary side coil connected to the primary side circuit and a secondary side coil electromagnetically coupled to the primary side coil, and a rectifier circuit 25 connected to the secondary side coil, rectifying the power induced to the secondary side coil and providing the rectified power to a load or a low voltage battery 200 having a lower voltage than the battery 100.

The apparatus of incorporating a non-isolated charger and a DC converter according to various embodiments of the present invention may be selectively operated as a non-isolated charger or as a DC converter when the vehicle is charged or driven.

When the apparatus of incorporating a non-isolated charger and a DC converter according to various embodiments of the present invention is operated as a charger, the first switch 211 included in the primary side circuit 21 of the DC converter 20 is turned off, and thus electrical connection between the battery 100 and the primary side circuit 21 is cut off. On the other hand, when the apparatus of incorporating a non-isolated charger and a DC converter according to the various embodiments of the present invention is operated as a DC converter, electrical connection between the PFC circuit 11 and the battery 100 may be cut off by use of the switching elements in the non-isolated converter 13.

The switching element Q0 and the capacitor 213 included in the primary side circuit 21 are implemented as an active clamp circuit together with the switching elements in the non-isolated converter 13, allowing the DC converter 20 to be operated as a flyback converter.

Figure 2:
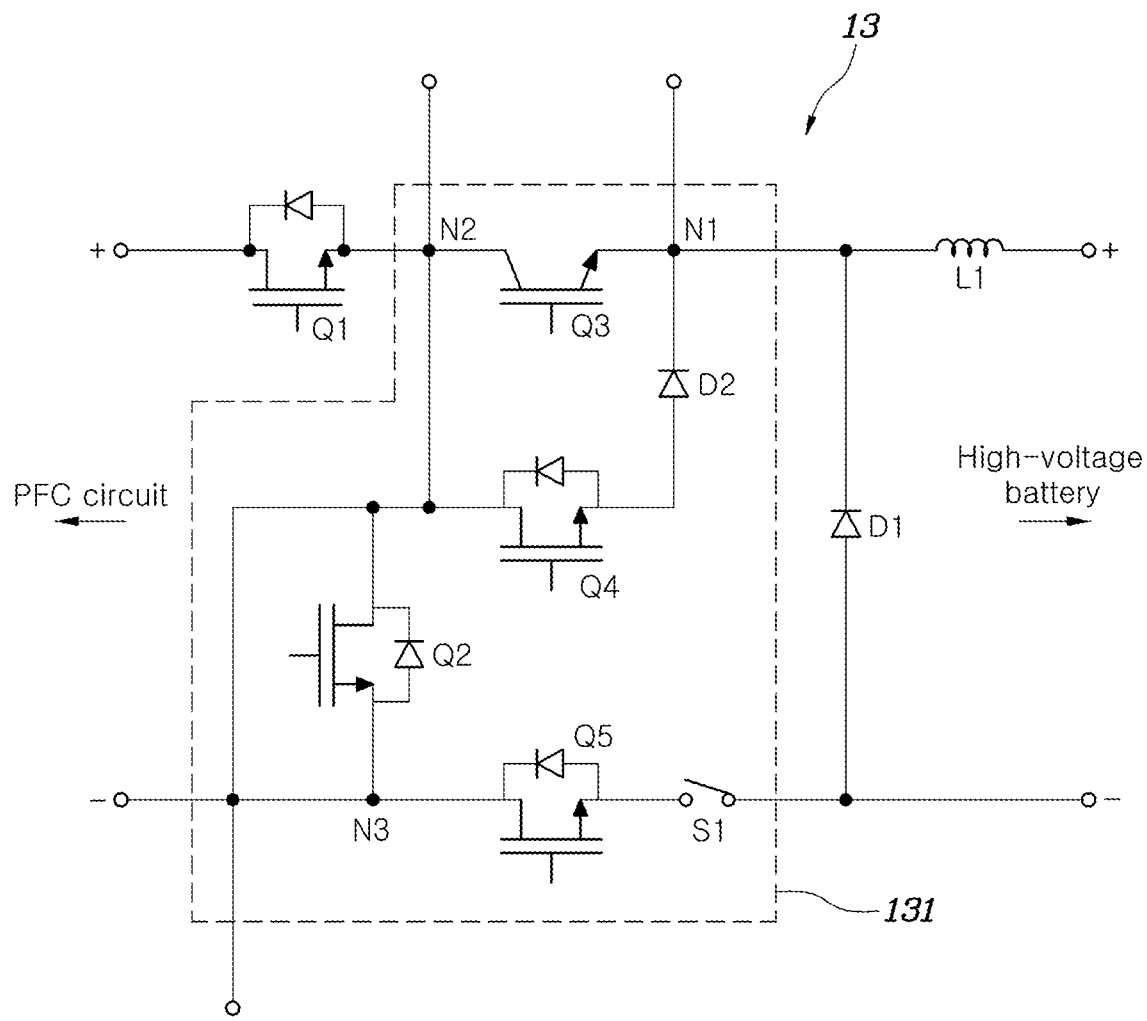
FIG. 2 is a circuit diagram illustrating in more detail an exemplary embodiment of a non-isolated converter in a non-isolated charger of an apparatus of incorporating a non-isolated charger and a DC converter according to an exemplary embodiment of the present invention illustrated in FIG. 1.

FIG. 2 is a circuit diagram illustrating in more detail an exemplary embodiment of a non-isolated converter in a non-isolated charger of an apparatus of incorporating a non-isolated charger and a DC converter according to an exemplary embodiment of the present invention illustrated in FIG. 1.

With reference to FIG. 2, the non-isolated converter 13 may have the topology of the buck converter. That is, the non-isolated converter 13 includes a first switching element Q1 having a first end portion connected to a positive (+) terminal of input terminals connected to the PFC circuit 11, an inductor L1 having a first end portion connected to a second end portion of the first switching element Q1 and a second end portion connected to a positive (+) terminal of the battery 100, and a first diode D1 having a cathode connected to the first end portion of the inductor L1 and an anode connected to a negative (−) terminal of the battery 100 or the input terminals, allowing the same to be implemented as a conventional buck converter reducing the current through the duty control of the first switching element Q1.

Furthermore, the non-isolated converter 13 may further include a current interruption circuit 131 interrupting the overcurrent or the leakage current.

The current interruption circuit 131 may include a second switching element Q2 having a first end portion connected to the second end portion of the first switching element Q1 and a second end portion connected to a negative (−) terminal of the input terminals, a third switching element Q3 having a first end portion connected to a node N1 corresponding to the cathode of the first diode D1 and a second end portion connected to a connection node N2 of the first switching element Q1 and the second switching element Q2, a fourth switching element Q4 having a first end portion connected to the connection node N2 of the first switching element Q1 and the second switching element Q2, a second diode D2 having an anode connected to a second end portion of the fourth switching device Q4 and a cathode connected to the node N1 corresponding to the cathode of the first diode D1, a fifth switching element Q5 having a first end portion connected to a node N3 corresponding to the second end portion of the second switching element Q2, and a second switch S1 having a first end portion connected to a second end portion of the fifth switching element Q5 and a second end portion connected to the anode of the first diode D1.

The current interruption circuit 131 including the switching elements Q1 to Q5 and the second switch S1 as described above may appropriately adjust on/off states of the switching elements Q1 to Q5 and the second switch S1 according to an external commercial power supply type connected to the PFC circuit 11 which is a front portion of the non-isolated converter 13 and a connection shape of the commercial power source and the PFC circuit 11, operating to interrupt the leakage current.

When the apparatus of incorporating a non-isolated charger and a DC converter according to various embodiments of the present invention operates as a charger, the first switch 211 included in the primary circuit 21 of the DC converter 20 is turned off, and for the switching elements Q1 to Q5 in the current interruption circuit 131 provided in the switching element 13, on or off states thereof may be appropriately controlled to be in accordance with a steady state where the current interruption is accomplished and an interrupted state where the current interruption is performed.

Figure 3:
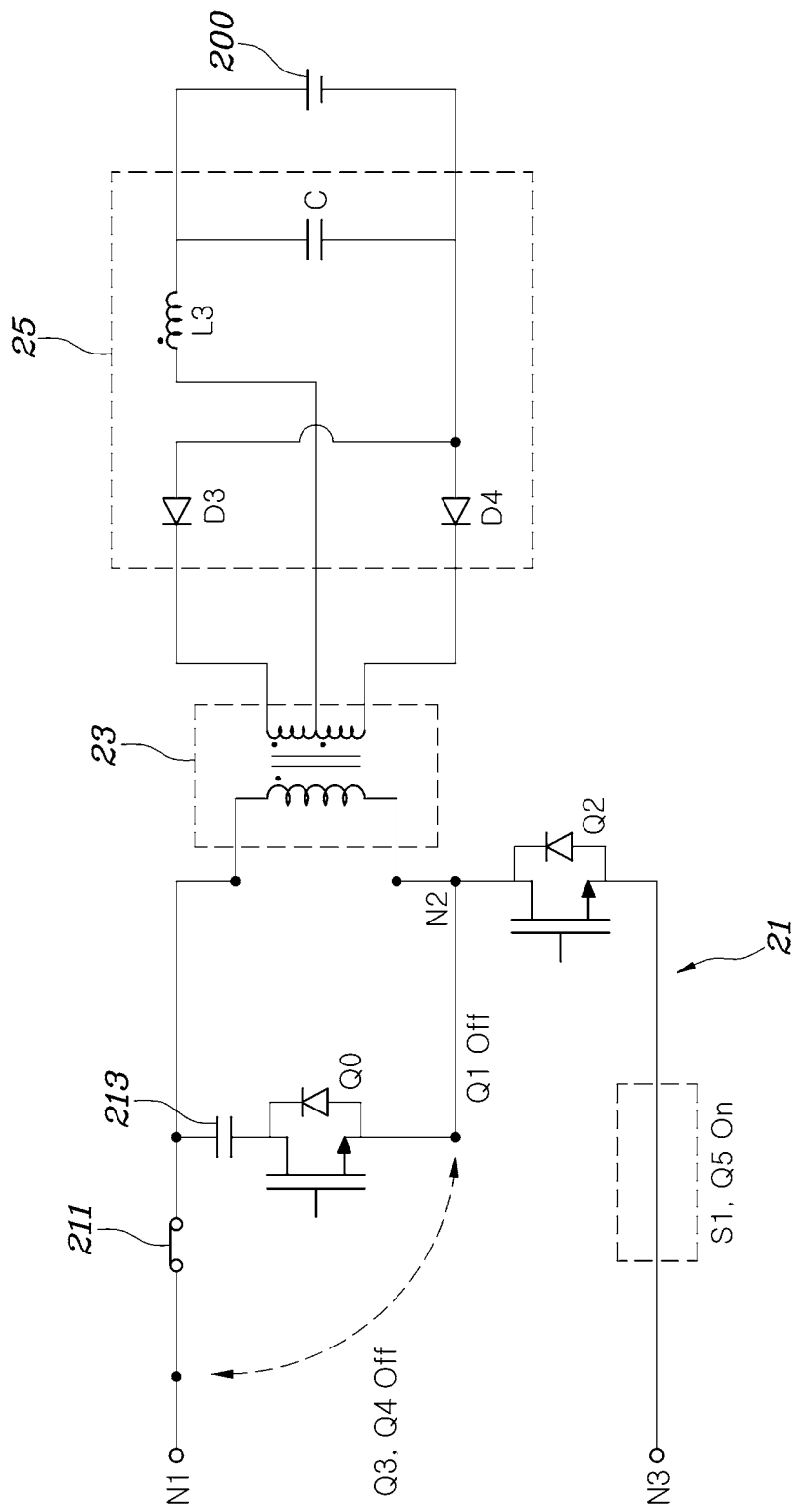
FIG. 3 is a circuit diagram illustrating in more detail a DC converter of an apparatus of incorporating a non-isolated charger and a DC converter according to an exemplary embodiment of the present invention illustrated in FIG. 1.

FIG. 3 is a circuit diagram illustrating in more detail a DC converter of an apparatus of incorporating a non-isolated charger and a DC converter according to an exemplary embodiment of the present invention illustrated in FIG. 1.

FIG. 3 illustrates a state where the switching elements of the current interruption circuit 131 in the non-isolated converter 13 are appropriately controlled so that the apparatus of incorporating a non-isolated charger and a DC converter according to the exemplary embodiment of the present invention is operated as a DC converter.

That is, the first switching device Q1 in the current interruption circuit 131 illustrated in FIG. 2 is turned off whereby the electrical connection between the PFC circuit 11 and the non-isolated converter 13 is cut off, the third and fourth switching elements Q3 and Q4, respectively, are turned off, and, when the fifth switching element Q5 and the second switch S1 are turned on, the primary side circuit 21 of FIG. 3 is completed. Meanwhile, a first end portion of the switching element Q0 provided separately from the non-isolated charger 10 to form the primary side circuit 21 is connected to the capacitor 213 and a second end portion thereof is connected to the connection node N2 of the first switching element Q1 and the second switching element Q2, that is, the first end portion of the second switching element Q2.

Through the present connection relationship, the primary circuit of the DC converter 21 forms an active clamp circuit.

The second switching element Q2 becomes a switch provided as a power source switch, the switching element Q0 becomes a clamp switch, and the capacitor 213 becomes a clamp capacitor.

A separate controller is configured to determine whether the incorporated apparatus is operated as the charger or the DC converter according to the connection state of the vehicle and external charging equipment or a running state of the vehicle, and controls the on/off states of the switches S1 and 211 and the first switching element Q1 and the third switching element to the fifth switching element Q3 to Q5, determining the connection state of the circuit. Furthermore, when the incorporated apparatus is operated as the DC converter, the DC converter 20 operates as a flyback converter by controlling on/off states of the second switching element Q2 and clamp switching element Q0.

Opposite end portions of a circuit structure formed by the clamp capacitor 213 and the clamp switching element Q0 connected to each other are connected to opposite end portions of the primary coil of the transformer 23, respectively, and a rectifier circuit 25 for generating DC power is connected to the secondary coil. The rectifier circuit 25 illustrated in FIG. 3 is an example implemented by diodes D3 and D4, an inductor L3, and a capacitor C connected to two secondary coils of the transformer 23. Naturally, the rectifying circuit 25 may be modified into various other structures known in the art or substituted for other structures.

Because operation of the flyback converter in which the primary side is implemented as an active clamp circuit is well known in the art and is not directly related to a main technical idea of the present invention, a further explanation thereon will be omitted.

The output of the rectifier circuit 25 may be connected to a low voltage battery 200 or an electric field load of the vehicle.

As described above, the apparatus of incorporating a non-isolated charger and a DC converter according to various embodiments of the present invention may allow the primary side circuit 21 of the DC converter 20 to be implemented by use of the switching elements included in the non-isolated converter 13 of the non-isolated charger 10, reducing the number of switching elements required for manufacturing the DC converter 20. Accordingly, not only the size of the entire circuit is reduced, but also the cost required for the switching elements is saved, whereby the production cost of the vehicle and the like may be reduced.

Although a controller determining and adjusting the state of each switching element is omitted in the accompanying drawings, a technique adjusting the state of the switching element in the related art by determining the state of the switching element and providing a corresponding control signal to the switching element is self-evident. A controller, not shown, may determine whether the incorporated apparatus according to various embodiments of the present invention will be operated as the converter or the charger by accounting for the state of the vehicle or commands input from a controller of a higher rank. Accordingly, a desired function may be achieved through the control of the switching elements as described above.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of incorporating a non-isolated charger and a DC converter, the apparatus comprising:
   the non-isolated charger including a non-isolated converter converting a level of input voltage and outputting converted voltage to a battery; and
   the DC converter including:
       a first switch selectively making an electrical connection to a connection node of the non-isolated converter and the battery; and a primary side circuit including at least one of a plurality of switching elements included in the non-isolated converter and converting a level of voltage of the battery transmitted by the primary side circuit and outputting converted voltage, wherein the non-isolated converter is a buck converter including:
- a first switching element having a first end portion connected to a positive terminal of input terminals;
- an inductor having a first end portion connected to a second end portion of the first switching element and a second end portion connected to a positive terminal of the battery; and
- a first diode having a cathode connected to the first end portion of the inductor and an anode connected to a negative terminal of the battery.

2. The apparatus of claim 1,
wherein the non-isolated converter includes a current interruption circuit including the plurality of switching elements for interrupting a transmission of an overcurrent and a leakage current input thereinto to the battery and realizes the primary side circuit by controlling states of the plurality of switching elements in the current interruption circuit.

3. The apparatus of claim 1, wherein the non-isolated converter further includes:
- a second switching element having a first end portion connected to the second end portion of the first switching element and a second end portion connected to a negative terminal of the input terminals;
- a third switching element having a first end portion connected to the cathode of the first diode and a second end portion connected to a connection node of the first switching element and the second switching element;
- a fourth switching element having a first end portion connected to the connection node of the first switching element and the second switching element;
- a second diode having an anode connected to a second end portion of the fourth switching element and a cathode connected to the first end portion of the third switching element and the cathode of the first diode;
- a fifth switching element having a first end portion connected to the second end portion of the second switching element; and
- a second switch having a first end portion connected to a second end portion of the fifth switching element and a second end portion connected to the anode of the first diode.

4. The apparatus of claim 1,
wherein a first end portion of the first switch is connected to the positive terminal of the battery,
wherein the primary side circuit further includes a clamp capacitor and a clamp switching element connected to each other in series to form a serial connection structure, and
wherein a first end portion of the serial connection structure of the clamp capacitor and the clamp switching element is connected to a second end portion of the first switch and a second end portion of the serial connection structure is connected to a first end portion of a switching element among the plurality of switching elements included in the current interruption circuit and having a second end portion connected to the negative terminal of the battery.

5. The apparatus of claim 3,
wherein a first end portion of the first switch is connected to the first end portion of the third switching element,
wherein the primary side circuit further includes a clamp capacitor and a clamp switching element connected to each other in series to form a serial connection structure, and
wherein a first end portion of the serial connection structure of the clamp capacitor and the clamp switching element is connected to a second end portion of the first switch and a second end portion of the serial connection structure is connected to the first end portion of the second switching element.

6. The apparatus of claim 5, wherein, when the apparatus of incorporating the non-isolated charger and the DC converter operates as a DC converter,
the first switching element, the third switching element, and the fourth switching element are configured to be turned off, and the fifth switching element and the second switch are configured to be turned on, and
the primary side circuit including the clamp capacitor, the clamp switching element, and the second switching element, is implemented as an active clamp circuit where the second switching element operates as a power switch.

7. The apparatus of claim 1, wherein, when the apparatus of incorporating the non-isolated charger and the DC converter operates as a charger, the first switch is configured to be turned off.

* * * * *